Dec. 31, 1929.     R. P. F. LIDDELL     1,741,705
FILTER
Filed Oct. 26, 1927     2 Sheets-Sheet 1
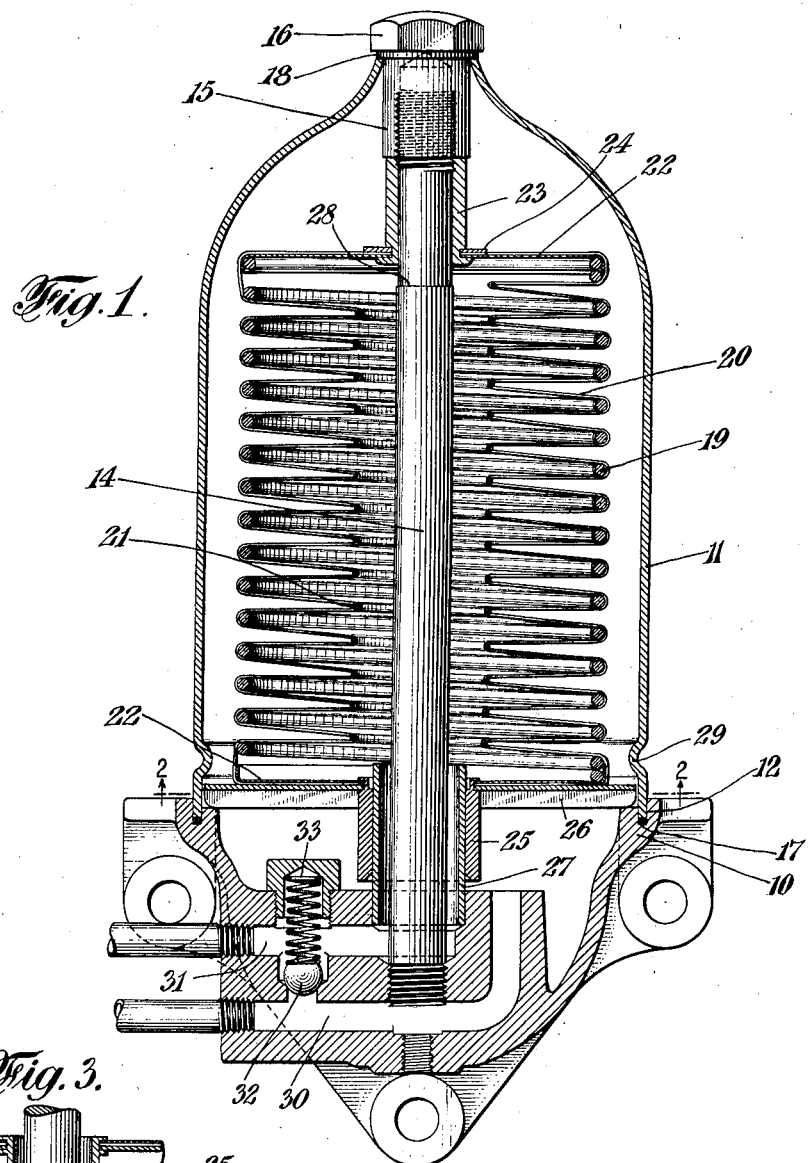
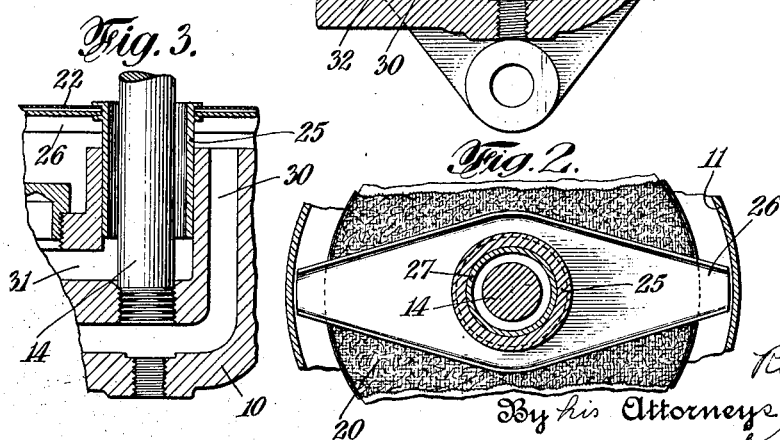
Inventor
Robert P. F. Liddell
By his Attorneys
Kenyon & Kenyon

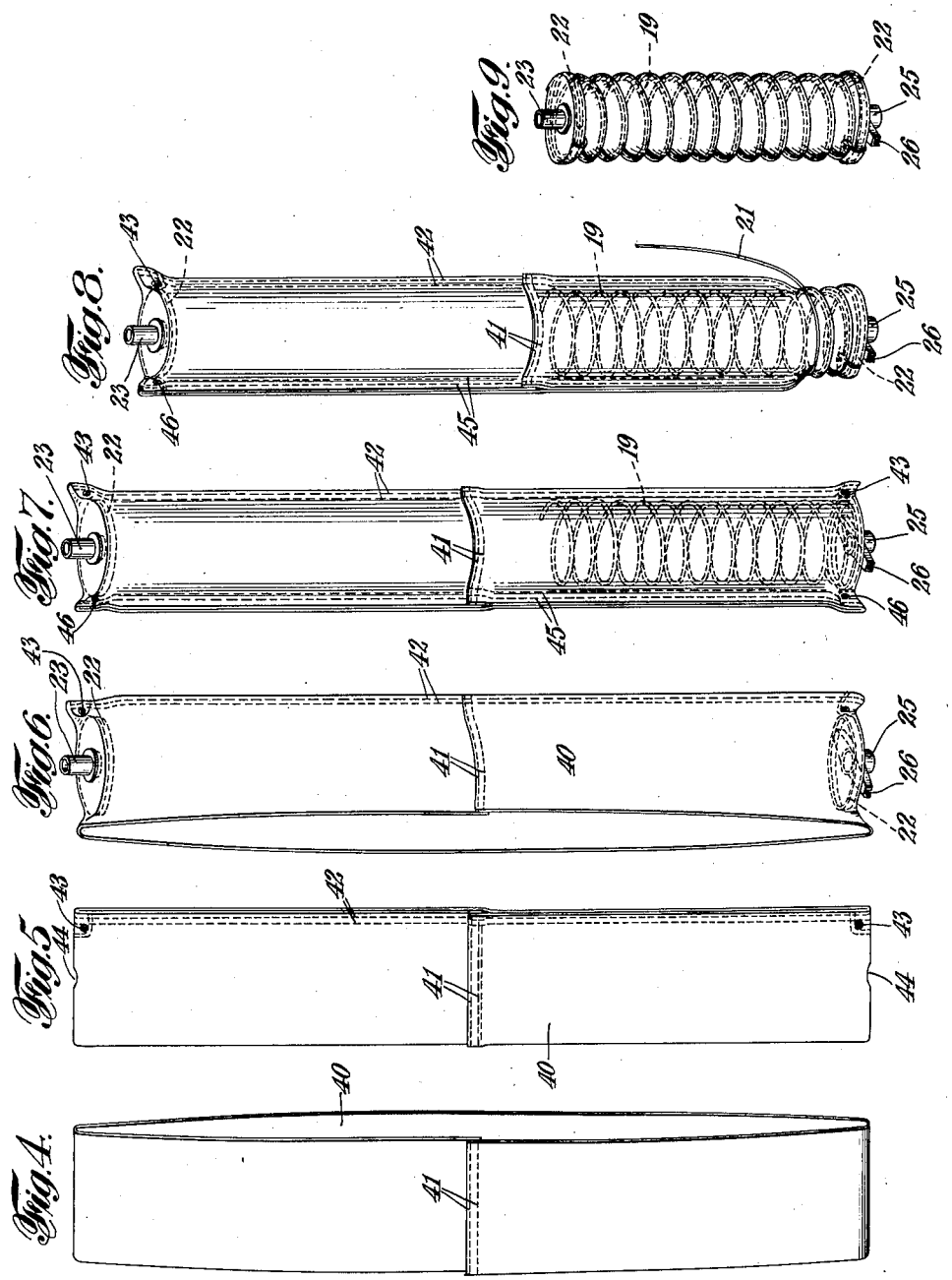

Patented Dec. 31, 1929

1,741,705

UNITED STATES PATENT OFFICE

ROBERT P. F. LIDDELL, OF NEW YORK, N. Y., ASSIGNOR TO MOTOR IMPROVEMENTS, INC., OF NEWARK, NEW JERSEY, A CORPORATION OF DELAWARE

FILTER

Application filed October 26, 1927. Serial No. 228,730.

This invention relates to filters and has for an object a simple, inexpensive and durable filter having a large filtering area relative to its displacement and which is capable of efficiently filtering the crank case oil of an internal combustion engine.

In one embodiment of the invention, the filter casing comprises a base and a cover which are connected to each other in such manner that the cover may readily be removed from the base. The cover which is of uniform thickness is cylindrical throughout the major portion of its length and is tapered along an ogee curve at the end remote from the base. A stud supported by the base extends nearly to the end of the cover, and there is provided a clamping member having a portion extending through the end of the cover remote from the base and threaded on the end of the stud. The ogee shape of the reduced end of the cover permits the application thereto without deformation of the reduced end of sufficient pressure to produce a fluid-tight joint between the cover and the base.

Within the casing is provided a filtering unit which comprises essentially an envelope of filtering material supported by a metal frame or helix. Sleeves are provided at opposite ends of the filtering unit, one of the sleeves being slidably mounted on the stud and the other being slidably mounted upon a tubular member concentric with the stud and forming therewith an annular channel communicating with the interior of the filtering unit. Preferably, the frame or helix is but slightly, if at all, resilient and requires little, if any, compression to fit it in place in the casing. The filtering unit is not of itself capable of withstanding without contraction the pressure of the oil in the casing, and means are therefore provided for limiting the movement of the ends of the unit toward each other.

The envelope preferably is composed of a single strip of filtering material, the edges of which are suitably stitched together. The envelope is made up in such a manner that there are no seams at its ends, thus obtaining certain advantages which will be brought out more in detail later.

Other objects, novel features and advantages of this invention will be apparent from the following specification and accompanying drawings, wherein Figure 1 is a vertical section through an embodiment of the invention;

Fig. 2 is a section on the line 2—2 of Fig 1;

Fig. 3 is a partial vertical section of a modified form; and

Figs. 4–9 inclusive illustrate the steps in the method of forming the filtering unit.

10 designates the base which supports the cover 11 and forms therewith the filter casing. The cover 11 is of uniform thickness and the major portion thereof is cylindrical while its upper end is contracted along on ogee curve and terminates in an aperture of considerably less diameter than that of the main portion of the cover. The opposite end of the cover 11 fits in a groove 12 in the base 10, the groove being of substantially the same width as the thickness of the cover wall. A stud 14 is threaded into the base 10 and extends substantially the full length of the cover 11. The boss 15 of a clamping member 16 extends through the aperture in the cover 11 and has a threaded connection with the end of the stud 14. A gasket 17 is arranged in the bottom of the groove 12 and a gasket 18 is interposed between the head of the clamping member 16 and the upper rim of the cover 11.

The filter unit comprises a metal frame such as the helix 19 which is surrounded by an envelope 20 of filtering material. Between adjacent turns of the helix, the envelope is drawn inwardly by means of a wire or the like 21. Each end of the helix is capped by a flanged metal disc 22. A sleeve 23 extends through aligned apertures in the upper end of the envelope and the upper disc 22, and has its end headed over to clamp the envelope and disc against the collar 24. At the bottom of the filtering unit there is provided a sleeve 25 which extends through aligned apertures in the bottom disc 22, the filtering envelope and a bridge 26, the ends of which project beyond the periphery of the filtering unit. The inner end of the sleeve is likewise headed over to clamp the aforementioned members against a shoulder formed on the sleeve. The sleeve 23 surrounds the upper end of the stud 14 and the sleeve 25 surrounds a tubular member 27 seated in a socket in the base 10, a tubular member 27 being concentric with the stud 14 and forming an annular chamber communicating with the interior of the filtering unit.

The upper end of the sleeve 23 is engaged by the boss 15 and a shoulder 28 on the stud limits the movement of the sleeve 23 toward the base 10. The ends of the bridge 26 rest upon the base 10 and an inwardly projecting rib 29 formed in the cover wall adjacent its lower rim overlies the ends of the bridge 26 and prevents movement thereof away from the cover 10. The filtering unit is thus held against any substantial contraction. An inlet channel 30 in the head 10 communicates with the interior of the casing and an outlet channel 31 in the head communicates with the annular channel between the stud 14 and the tube 27. A bypass 32 leads from the channel 30 to the channel 31 and is controlled by a relief valve 33.

In the modification disclosed in Fig. 3, the tubular member 27 is dispensed with and the sleeve 25 is arranged in a socket formed in the base. This arrangement also provides an annular channel communicating with the interior of the filtering unit. In both modifications, the sleeves are fitted very snugly, so as to prevent any material seepage of oil along them.

The shape of the cover permits the formation of a liquid-tight joint between the lower rim of the cover and the base. Because of the ogee curve of the reduced portion, pressure applied to the upper end of the cover does not deform the cover but is transferred to the cylindrical portion. Pressure applied to the upper edge of the cover forces the same into contact with the boss 15 of the clamping member 16 thereby preventing inward movement of the reduced portion of the cover. It is thus possible to apply sufficient pressure through the medium of the clamping member 16 that the joint between the cover and base is fluid-tight. The provision of the stud 14 also makes it possible to apply such pressure to the cover through the clamping member 16.

The helix 19 is preferably slightly, if at all, resilient, so that it requires little, if any, compression when being assembled in the casing. Having the helix of such a design permits easy assembling of the filter. However, with such a helix the pressure normally existing in a filter connected to the lubricating system of an internal combustion engine is sufficient to cause contraction of the filtering unit. Contraction of the filtering unit causes a reduction in the efficiency of the filter. In the present instance, contraction of the unit is prevented by the shoulder 28 and by the co-operation of the bridge 26 and the rib 29.

Reference to Figs. 4 to 9 inclusive discloses the manner of producing the filtering unit. A strip of filtering material, such, for example, as canton flannel, has its ends folded toward each other and stitched together to form a seam 41 as shown in Fig. 4. The nap side of the flannel forms the exterior side of the loop thus formed. The loop is then flattened with the seam 41 arranged intermediate the end folds and the edges are stitched together as at 42. Also eyelets 43 are mounted in the strip at either end of the seam 42. Apertures 44 are cut in the flannel at the folds. A disc 22 is then inserted at one end and the sleeve 23 passed through the aperture 41, and its inner end is headed over the disc 22. Another disc 22 is inserted in the other end of the envelope and in a similar manner is associated with the bridge 26 and sleeve 25. The helix 19 is then arranged with one end fitting into the cap formed by one of the disc 22. The remaining edges of the strip 40 are stitched together as at 45, thus completing the envelope of the filtering unit. Eyelets 46 are then fastened to the envelope at opposite ends of the seam 45. The cord or wire 21 is then passed through the eyelets 43 and 46 at the end of the envelope adjacent the disc 22 in which the helix 19 has been arranged and is fastened to one of the eyelets. The wire is then wrapped around the envelope between turns of the helix 19, thus drawing the envelope inwardly and drawing the opposite end of the envelope toward the helix until the remaining disc 22 engages the remaining end of the helix. The wire is then engaged with the remaining eyelets 43 and 46 in a similar manner. There are no seams across the end of the filtering unit, thus ensuring a tight joint between the sleeves and the caps, so that there will be no seepage into the filtering unit at these points. The structure of the filter is such that it can be readily disassembled and a new unit substituted without the possibility of leaving out any parts or wrongly arranging the elements. In assembling the filter, the sleeve 25 is passed over the stud 22 and the sleeve 23 slid on to the upper end of the stud. This brings the bridge 26 into contact with the base and locates the filtering unit in proper position. The cover 11 is next arranged with its lower rim in the groove 12, after which the boss 15 of the clamping member 16 is passed through the upper end of the cover and threaded on to the upper end of the stud 14. In so doing, the boss engages the upper end of the sleeve 23 and may compress slightly the helix 19.

The above-described filter has several advantages. It is composed of only a few elements which may be readily dis-assembled and assembled without any particular mechanical ability. When it is desired to replace the unit it is necessary merely to unscrew the clamping member 16, lift the cover 21 and remove the filtering unit. A new unit may be easily arranged in position on the stud 14 and the cover replaced. As the filtering unit is not put under compression to any extent in assembling the filter, no difficulty is experienced in threading the clamping member on to the end of the stud. The groove in the base 10 is of substantially the same width as the thickness of the wall of the tubular member 11 so that a snug fit is provided. The gasket in the bottom of the groove 10 cannot spread because of the relationship between the width of the groove and the thickness of the cover wall and so may be tightly compressed. By virtue of the ogee shape of the reduced end of the cover 11, a very substantial pressure may be applied without deforming the cover and still form the cover of comparatively light stock. The use of a solid stud provides a firm support for the clamping member 16 by means of which the necessary pressure is applied to the cover 11.

It is of course understood that various modifications may be made in the structure above disclosed without in any way departing from the spirit of the invention as defined in the appended claims.

I claim:

1. In a filter, a casing, a filtering unit comprising a flexible frame enclosed by an envelope of filtering material, means for slidably supporting the ends of said unit and means for limiting contraction of said unit.

2. In a filter, a casing, a filtering unit comprising a flexible frame enclosed by an envelope of filtering material, a member extending from said casing through said filtering unit and slidably supporting one end thereof, and means for limiting contraction of said unit.

3. In a filter, a casing, a filtering unit comprising a flexible frame enclosed by an envelope of filtering material, a sleeve in either end of said unit, a member supported by said casing and passing through both of said sleeves, one of said sleeves fitting said member snugly but slidably and means for limiting contraction of said filtering unit.

4. In a filter, a casing, a filtering unit comprising a frame enclosed by an envelope of filtering material, a sleeve in either end of said unit, a member supported by said casing and passing through both of said sleeves, one of said sleeves fitting said member snugly but slidably and the second of said sleeves being of larger bore than said first sleeve, means for slidably supporting said second sleeve and providing a passageway communicating with the interior of said unit, and means for limiting movement of said sleeves towards each other.

5. In a filter, a casing, a filtering unit comprising a frame enclosed by an envelope of filtering material, a sleeve in either end of said unit, a member supported by said casing and passing through both of said sleeves, one of said sleeves fitting said member snugly but slidably and the second of said sleeves being of larger bore than said first sleeve, means for slidably supporting said second sleeve and providing a passageway communicating with the interior of said unit, means on said member for limiting movement of said first sleeve toward said second sleeve and means on said second sleeve and casing for preventing movement of said second sleeve toward said first sleeve.

6. In a filter, a casing, a filtering unit comprising a frame enclosed by an envelope of filtering material, a sleeve in either end of said unit, a member supported by said casing and passing through both of said sleeves, one of said sleeves fitting said member snugly but slidably and the second of said sleeves being of larger bore than said first sleeve, means for slidably supporting said second sleeve and providing a passageway communicating with the interior of said unit, means on said member for limiting movement of said first sleeve toward said second sleeve, a member carried by said second sleeve and projecting beyond the periphery of said filtering unit and a stop provided on the inner wall of said casing to be engaged by said member to prevent movement of said second sleeve toward said first member.

7. In a filter, a casing, a filtering unit comprising a frame enclosed by an envelope of filtering material, a sleeve in either end of said unit, a member supported by said casing and passing through both of said sleeves, one of said sleeves fitting said member snugly but slidably and the second of said sleeves being of larger bore than said first sleeve, means for slidably supporting said second sleeve and providing a passageway communicating with the interior of said unit, means on said member for limiting movement of said first sleeve toward said second sleeve, a member carried by said second sleeve and projecting beyond the periphery of said filtering unit and an inwardly extending projection formed in the casing wall to be engaged by said member to prevent movement of said second sleeve toward said first sleeve.

8. In a filter, a casing, a filtering unit comprising a frame enclosed by an envelope of filtering material, a sleeve at either end of said unit, a stud supported by said casing and extending through both of said sleeves, one of said sleeves fitting said member snugly but slidably and the second of said sleeves being of larger bore than said first sleeve, means for slidably supporting said second sleeve and providing a passageway communicating with the interior of said filtering unit, a conduit communicating with said passage and a second conduit communicating with the interior of said casing.

9. In a filter, a casing comprising a base having a circular groove, a tubular member having one end arranged in said groove and its opposite end tapered along an ogee curve, a filtering unit comprising a frame enclosed by an envelope of filtering material, a sleeve at either end of said filtering unit, a solid stud attached to said base and extending through both of said sleeves, a clamping member having a portion extending through the reduced end of said tubular member and having a threaded connection with said stud, one of said sleeves fitting said stud snugly but slidably and the second of said sleeves being of larger bore than said first sleeve, means for slidably supporting said second sleeve and providing a passageway communicating with the interior of the filtering unit, means for preventing contraction of the filtering unit, a conduit in said base communicating with said passage and a second conduit in said base communicating with the interior of said casing.

10. In a filter, a casing, a filtering unit comprising a flexible frame enclosed by an envelope of filtering material, a sleeve in each end of said unit means snugly fitted by said sleeves for slidably supporting the same and means for preventing contraction of said filtering unit.

11. In a filter, a casing, a filtering unit comprising a flexible frame enclosed by an envelope of filtering material, a sleeve in each end of said unit and means snugly fitted by said sleeves for slidably supporting the same, said means comprising a member supported by said casing and extending through both of said sleeves.

12. A filtering unit comprising a tubular frame and an envelope enclosing said frame, said envelope being composed of a single length of filtering material folded transversely at two places to bring the ends into contact intermediate the folds.

13. A filtering unit comprising a helix and an envelope enclosing said helix, said envelope being composed of a single length of filtering material having its ends joined together and folded transversely at two places to present the joined ends of the strip intermediate the ends of the envelope.

14. A filtering unit comprising a helix, an envelope enclosing said helix, a metal cap for each end of the helix, and a sleeve extending through each cap and said envelope, said sleeve being supported by said cap and clamping together said cap and envelope.

15. A filtering unit comprising a helix, an envelope enclosing said helix, said envelope being composed of a single length of filtering material having its ends joined together and folded transversely at two places to present the joined ends of the strip intermediate the ends of the envelope, and a second helix of smaller diameter enclosing said envelope, the turns of said second helix being interposed between turns of the first helix.

16. In a filter, a casing, a filter unit therein, comprising a resilient frame, an envelope of filtering material supported by said frame, a member supported by said casing and extending through said unit, a sleeve slidably and snugly mounted on said member and connected to one end of said frame, means forming with said member an annular passageway communicating with said unit at the other end of said frame, and channels communicating with said annular passageway and the space between the filter unit and the casing walls.

17. In a filter, a base and a cover forming a casing, a filtering unit therein comprising a resilient frame and an envelope of filtering material supported by said frame, a member supported by said base and extending through said filtering unit, a sleeve slidably and snugly mounted on said member and connected to one end of said frame, a cover clamping member extending through said cover to engage said sleeve and having a threaded connection with said first member, means forming with said member an annular passageway communicating with said filtering unit at the other end of said frame, and channels communicating with said annular passageway and the space between said filtering unit and the casing wall.

18. In a filter, a casing, a filtering unit therein comprising a frame and an envelope of filtering material supported thereby, a sleeve mounted in either end of said unit, a supporting member extending through both of said sleeves, one of said sleeves having a sliding but snug fit therewith, and means other than said supporting member extending from said casing for slidably but snugly supporting said second sleeve co-axial with said member.

19. In a filter, casing, a fitlering unit comprising a frame enclosed by an envelope of filtering material, a sleeve in each end of said unit, a supporting member extending through both of said sleeves and being slidably but snugly surrounded by one sleeve and means other than said supporting member snugly fitted by the other sleeve for slidably supporting the same.

20. In a filter, a casing, a filtering unit comprising a frame enclosed by an envelope of filtering material, a sleeve in each end of said unit, a supporting member extending through both of said sleeves and being slidably but snugly surrounded by one sleeve, means snugly fitted by the other sleeve for slidably supporting the same and means for preventing contraction of said filtering unit.

21. In a filter, a casing, a filtering unit comprising a flexible frame enclosed by an envelope of filtering material, a sleeve in each end of said unit, a supporting member passing through both of said sleeves, one of said sleeves being snugly but slidably fitted on said member and the other of said sleeves being spaced from said supporting member and means snugly fitted by said last sleeve for slidably supporting the same.

22. In a filter, a casing, a filtering unit comprising a flexible frame enclosed by an envelope of filtering material, a sleeve in each end of said unit, a supporting member passing through both of said sleeves, one of said sleeves being snugly but slidably fitted on said member and the other of said sleeves being spaced from said supporting member, means snugly fitted by said last sleeve for slidably supporting the same, a channel communicating with the interior of the filtering unit and extending between the sleeve and the supporting member and a second channel communicating with the space between said filtering unit and said casing.

23. In a filter, a base and a cover forming a casing, a filtering unit therein comprising a resilient frame enclosed by an envelope of filtering material, a sleeve in each end of said unit, a member supported by said base and extending through both of said sleeves, said member being slidably but snugly surrounded by one sleeve, means snugly fitted by the other sleeve for slidably supporting the same and means cooperating with said member for clamping said cover to the base.

24. In a filter, a base and a cover forming a casing, a filter unit therein comprising a flexible frame enclosed by an envelope of filtering material, a sleeve in each end of said unit, a member supported by said base and extending through both of said sleeves, one of said sleeves being snugly but slidably fitted on said member and the other of said sleeves being spaced therefrom, means snugly fitted by said last sleeve for slidably supporting the same and means co-operating with said member for clamping the cover to the base.

25. In a filter, a casing, a filter unit comprising an envelope of filtering material, a helix within said envelope, a second helix surrounding said envelope, said second helix being of smaller diameter than said first helix and having its turns arranged between the turns of said first helix, a sleeve in each end of said unit, and means snugly fitted by said sleeves for slidably supporting the same.

26. In a filter, a casing, a filtering unit comprising an envelope of filtering material, a resilient helix within said envelope, a second helix surrounding said envelope, said second helix being of smaller diameter than said first helix and having its turns arranged between the turns of said first helix, a sleeve in each end of said unit, means snugly fitted by said sleeves for slidably supporting the same, and means for preventing contraction of said filtering unit.

27. In a filter, a casing, a filtering unit therein comprising a resilient frame and an envelope of pliable filtering material supported by said frame, a sleeve in either end of said unit, and a supporting member extending through both of said sleeves, one of said sleeves having a sliding but snug fit with said member.

28. In a filter, a casing, a filtering unit therein comprising a flexible frame and an envelope of pliable filtering material supported by said frame, a supporting member passing through both ends of said unit, a sleeve carried by one end of said unit and snugly but slidably surrounding said supporting member, a channel communicating with the interior of said unit, and a second channel communicating with the space between said casing and said unit.

In testimony whereof, I have signed my name to this specification.

ROBERT P. F. LIDDELL.